United States Patent [19]

Goebel et al.

[11] 4,446,211

[45] May 1, 1984

[54] RESERVE ELECTROCHEMICAL BATTERY

[75] Inventors: Franz Goebel, Sudbury; Morton A. Slavin, Marblehead, both of Mass.

[73] Assignee: GTE Communications Products Corporation, Stamford, Conn.

[21] Appl. No.: 494,152

[22] Filed: May 13, 1983

[51] Int. Cl.³ .............................................. H01M 6/36
[52] U.S. Cl. ..................................... 429/101; 429/116
[58] Field of Search ................. 429/110, 116, 52, 152, 429/153, 154, 101

[56] References Cited

U.S. PATENT DOCUMENTS

| 2,684,989 | 7/1954 | Wilburn | 429/154 |
| 2,847,494 | 8/1958 | Jeannin | 429/116 |
| 3,674,566 | 8/1972 | Powers | 429/116 |
| 4,287,273 | 9/1981 | Harney et al. | 429/153 |

FOREIGN PATENT DOCUMENTS

| 2754651 | 6/1978 | Fed. Rep. of Germany | 429/116 |
| 3122080 | 3/1982 | Fed. Rep. of Germany | 429/116 |

Primary Examiner—Donald L. Walton
Attorney, Agent, or Firm—David M. Keay

[57] ABSTRACT

A reserve battery of electrochemical cells employing several housing sections of conductive material stacked in a series arrangement with insulation at the points of connection. Each two adjacent housing sections form a chamber. Each chamber contains anode members in contact with one of the housing sections forming the chamber and cathode members in contact with the other of the housing sections forming the chamber. A central conduit through the stack of housing sections is formed by inner walls of the housing sections. Holes in these walls provide passageways from the conduit into the chambers. To activate the cells an electrolytic solution stored in a reservoir is forced into the conduit and through the passageways into each chamber. A series of one-way valves along the conduit physically and electrically seal off the solution in each chamber from that in every other chamber. Thus, each chamber contains an activated electrochemical cell with the cells connected in series to provide a battery.

12 Claims, 1 Drawing Figure

U.S. Patent
May 1, 1984
4,446,211
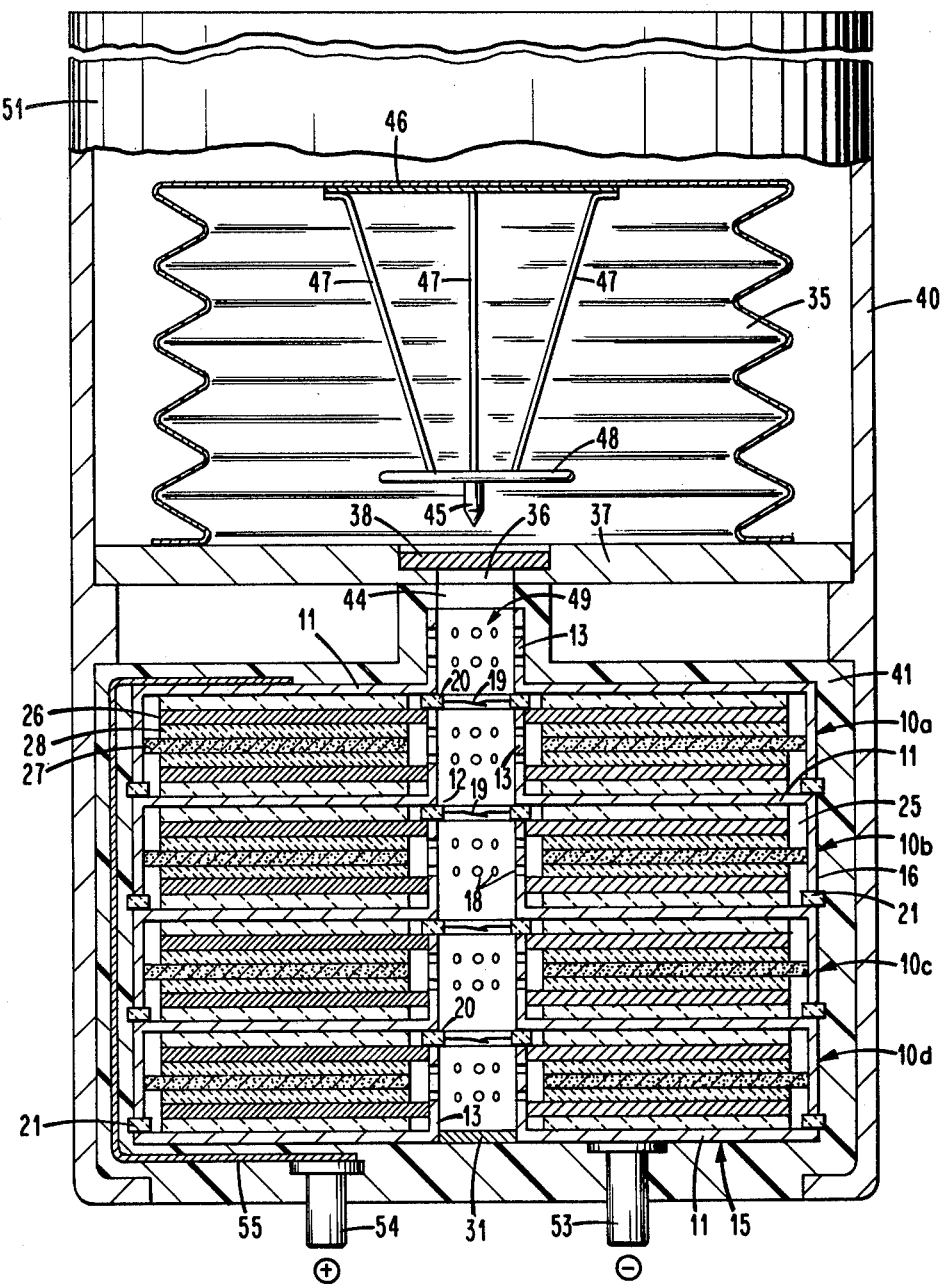

RESERVE ELECTROCHEMICAL BATTERY

BACKGROUND OF THE INVENTION

This invention relates to electrochemical cells. More particularly, it is concerned with a reserve battery of electrochemical cells arranged in series.

It is frequently necessary for electrochemical cells to be connected in series in order to provide voltages higher than those produced by an individual cell. For example, lithium/thionyl chloride electrochemical cells normally discharge at 3.5 volts, and for many applications it is necessary to employ these cells in applications having higher voltage requirements.

Typically, each cell is packaged in an individual case having exposed positive and negative terminals. As is well understood, to provide a series of cells the positive terminal of each cell is connected to the negative terminal of the next cell in the series. The individual cells of the series may be packaged within a single case with appropriate terminal connections to provide a unitary battery structure.

For certain applications it is desirable to employ reserve batteries. In reserve batteries a constituent of the electrochemical system of each cell is held in a reservoir separate from other components of the electrochemical system. The cells of the battery are activated by transferring the constituent from the reservoir to the individual cells. The arrangement for storing the constituent and rapidly transferring it to the several cells of a battery of individual cells become complicated and cumbersome.

SUMMARY OF THE INVENTION

A reserve battery of electrochemical cells in accordance with the present invention comprises a plurality of similar housing sections of conductive material arranged in series. Each housing section is electrically insulated from the adjacent housing sections. Each two adjacent housing sections form an enclosed chamber between them. Each chamber contains an anode electrode member of an electrochemical system and a cathode electrode member of an electrochemical system. The anode electrode member is in electrical contact with the housing section of one of the housing sections forming the chamber, and the cathode electrode member is in electrical contact with the housing section of the other housing section forming the chamber.

Portions of the housing sections form a conduit, and each housing section has an opening in the portion to provide passageways between the conduit and each of the chambers. A reservoir means contains a fluid constituent of an electrochemical system. The fluid constituent, an anode electrode member, and a cathode electrode member provide a complete electrochemical system of an electrochemical cell. The reservoir means is sealed from the conduit by a rupturable sealing means. An activating means operates when actuated to rupture the rupturable sealing means and force the fluid constituent in the reservoir means into the conduit and through the passageways into the chambers. Valve means seal the fluid constituent within each chamber from the fluid constituent within each of the other chambers.

Thus, when the activating means is actuated, a battery of active individual electrochemical cells arranged in series is provided with each housing section serving as the positive terminal for the electrochemical system within one chamber and the negative terminal for the electrochemical system within an adjacent chamber.

BRIEF DESCRIPTION OF THE DRAWING

The single FIGURE of the drawing illustrates an electrochemical battery in accordance with the present invention in an elevational view partially in cross section.

For a better understanding of the present invention, together with other and further objects, advantages, and capabilities thereof, reference is made to the following discussion and appended claims in connection with the above-described drawing.

DETAILED DESCRIPTION OF THE INVENTION

The single FIGURE of the drawing illustrates a reserve battery of electrochemical cells arranged in series. The battery is generally cylindrical in shape and is fabricated from several identical housing sections 10a–10d and a modified housing section 15. The housing sections are of a suitable metal, for example stainless steel or nickel. Each of the identical housing sections 10a–10d includes a flat planar disc 11 having a central opening 12 with a first hollow cylindrical or tubular member 13 affixed to the disc at the edge of the central opening 12. The first cylindrical member 13 extends in one direction (upward as shown in the FIGURE) normal to the plane of the disc 11. The walls of the first cylindrical member have several openings 18 therethrough. Each identical housing section 10a–10d also includes a second hollow cylindrical member 16 affixed to the disc 11 at its outer edge. The second cylindrical member 16 extends in the opposite direction (downward as shown in the FIGURE) normal to the plane of the disc 11.

As can be seen from the FIGURE the housing sections are stacked in a series arrangement. The housing sections are electrically insulated from each other. A first member of insulating material 20 is disposed between the edge surface at the end of each first cylindrical member 13, except the one that is uppermost, and the disc 11 of the housing section above it at the periphery of the central opening 12 in the disc 11. The member 20 extends across the hollow cylindrical member 13 and, as indicated in the FIGURE, provides a one-way or check valve 19, the function of which will be explained in detail hereinbelow. A second member of insulating material 21 of annular shape is disposed between the edge surface at the end of the second cylindrical member 16 of each identical housing section 10a–10d and the disc 11 of the housing section below it at the outer edge of the disc 11. The members of insulating material 20 and 21 seal the housing sections together with each two adjacent housing sections forming an enclosed chamber 25 of annular configuration between them.

The lowermost housing section 15 is a modified section. It includes a flat, planar disc 11 and a first cylindrical member 13 of small diameter similar to the other housing sections 10a–10d. It does not include a second cylindrical member of large diameter. Members of insulating material 20 and 21 seal the modified housing section 15 to the adjacent housing section 10d to form the lowermost chamber between them. A disc 31 of conductive material is placed across the central opening 12 in the disc 11 to close the lower end of the small cylindrical member 13.

Within each chamber 25 formed by two adjacent housing sections are certain of the components of an electrochemical system of an electrochemical cell. Although any of various known arrangements of stacks of electrochemical cell components may be employed in each chamber, preferably the stack is an arrangement as disclosed in U.S. Pat. No. 4,284,691 entitled "Electrochemical Cell" which issued on Aug. 18, 1981, to Franz Goebel and William T. McHugh.

The portion of an electrochemical system positioned within each chamber 25 includes a set of substantially flat, planar, generally circular anode electrode members 26 and a set of substantially flat, planar, generally circular cathode electrode members 27. The anode electrode members 26 and the cathode electrode members 27 are arranged in alternation and are separated from each other and the discs 11 of the housing sections by intervening separators 28 of insulating material. The anode electrode members 26 have a central opening of a diameter smaller than the outer diameter of the first cylindrical members 13 and an outer diameter smaller than the inner diameter of the second cylindrical members 16. The cathode electrode members 27 have a central opening of a diameter larger than the outer diameter of the first cylindrical members 13 and an outer diameter larger than the inner diameter of the second cylindrical members 16. Thus, within each chamber 25 the anode electrode members 26 make direct physical and electrical contact with the first cylindrical member 13 of the lower of the two housing sections forming the chamber, and are spaced from the second cylindrical member 16 of the upper of the two housing sections forming the chamber. The cathode electrode members 27 makes direct physical and electrical contact with the second cylindrical member 16 of the upper of the two housing sections forming the chamber, and are spaced from the first cylindrical member 13 of the lower of the two housing sections forming the chamber. With this arrangement the lower housing section of each chamber becomes the negative terminal of the cell and the upper housing section becomes the positive terminal of the cell.

The anode electrode members 26 include an oxidizable active material, specifically lithium. The cathode electrode members 27 contain porous carbon conglomerate material and serve as cathode current collectors. In order to complete the electrochemical system for each cell a fluid constituent is required, for example with cells of the general type under discussion, an electrolytic solution of a reducible liquid cathode material with a dissolved electrolyte solute. More specifically, for one well known class of lithium/fluid oxyhalide cells the fluid constituent may be thionyl chloride having lithium tetrachloroaluminate dissolved therein.

The electrolytic solution which is the fluid constituent necessary to complete the electrochemical system within each chamber 25 and provide a series of active electrochemical cells is stored in an enclosed collapsible reservoir 35 having side walls in the form of a bellows. An opening 36 in the bottom wall 37 of the reservoir 35 is sealed by a relatively thin membrane 38. The reservoir 35 is mounted in position with respect to the assembly of battery housing sections by an outer metal shell 40. The assembly of battery housing sections is covered by a protective insulating layer 41 and mounted in the outer shell 40. A portion of the protective insulating layer 41 extends from the upper edge of the small cylinder 13 of the uppermost housing section 10a to the bottom wall 37 of the reservoir 35 encircling the opening 36 and forming a channel 44 from the reservoir to the upper edge of the first cylindrical member 13.

A spike 45 is positioned within the reservoir 35 adjacent to the membrane 38. The spike 45 is mounted to the upper wall 46 of the reservoir by thin, collapsible supports 47. A member 48 which is larger than the opening 36 in the bottom wall 37 is fixed to the spike 45. A suitable mechanism (not shown) located in the upper portion 51 operates to collapse the bellows when it is desired to activate the battery. The mechanism may include a mechanical arrangement acting on the upper wall 46 of the reservoir to force it downward toward the bottom wall 37. Alternatively, the mechanism may release a gas into the chamber surrounding the reservoir 35 causing it to collapse under pressure.

In any event, to activate the reserve battery the upper wall 46 is moved downward forcing the spike 45 through the membrane 38. The fluid within the reservoir is forced through the hole produced in the membrane 38 by the spike 45. The member 48 limits the depth of penetration of the spike 45, and further movement of the upper wall 46 collapses the spike supports 47. The fluid flows through the channel 44, through the conduit 49 formed by the series of hollow first cylindrical members 13, and through the one-way valves 19 disposed between the cylindrical members 13. The fluid flows from the central conduit 49 through the lateral passageways 18 in the side walls of the cylindrical members 13 into the chambers 25. The valves 19 close after the fluid has been forced into all the chambers, thus providing physical and also electrical isolation of the fluid within each chamber from that within each of the other chambers. The electrochemical system within each chamber thus constitutes a complete individual electrochemical cell.

The battery illustrated in the FIGURE contains four electrochemical cells arranged in series. Since a housing section serves as the negative terminal for the electrochemical cell in the chamber for which it is the lower housing section and serves as the positive terminal for the electrochemical cell in the chamber for which it is the upper housing section, the lowermost housing section 15 becomes the negative terminal of the battery and the uppermost housing section 10a becomes the positive terminal of the battery. An external negative terminal 53 for the battery may be connected directly to the lowermost housing section 15 and extend through the protective insulative coating 41. An external positive terminal 54 may be mounted in the protective insulative coating 41 and connected to the uppermost housing section 10a by way of a conductive lead 55 protected by the insulative coating 41.

The particular fluid constituent reservoir, its mounting with respect to the assembly of housing sections, and the manner in which the fluid constituent is forced from the reservoir are exemplary and any of various known techniques and structural arrangements may be employed to store the fluid constituent and deliver it to the conduit of the assembled housing sections.

Reserve batteries in accordance with the present invention employ several identical housing sections which need be modified only at the upper and/or lower ends of the battery. Thus a battery containing a greater number of cells requires a greater number of identical housing sections but not a greater number of specialized parts. The battery requires no additional interconnections or jumpers between terminals of individual cells to connect the cells in electrical series. Thus the IR drops caused by such interconnections are eliminated. The battery is relatively compact since no additional structural components for supporting and packaging individual cells as a unitary battery nor insulation for providing protection between individual cells are required. Thus, the electrochemical energy of the battery per unit of weight and per unit of volume is high.

While there has been shown and described what is considered a preferred embodiment of the present invention, it will be obvious to those skilled in the art that various changes and modifications may be made therein without departing from the invention as defined by the appended claims.

What is claimed is:

1. A reserve battery of electrochemical cells comprising
    a plurality of similar housing sections of conductive material arranged in series;
    each housing section being electrically insulated from adjacent housing sections;
    each two adjacent housing sections forming a chamber between them;
    each chamber containing
        an anode electrode member of an electrochemical system, and
        a cathode electrode member of an electrochemical system,
        the anode electrode member being in electrical contact with the housing section of one of the housing sections forming the chamber, and
        the cathode electrode member being in electrical contact with the housing section of the other of the housing sections forming the chamber;
    portions of said housing sections forming a conduit;
    each housing section having an opening in said portion providing passageways between the conduit and each of said chambers;
    reservoir means containing a fluid constituent of an electrochemical system, said fluid constituent, a said anode electrode member, and a said cathode electrode member providing a complete electrochemical system of an electrochemical cell;
    rupturable sealing means sealing said reservoir means from said conduit;
    activating means operable when actuated to rupture said rupturable sealing means and force said fluid constituent in the reservoir means into said conduit and through said passageways into said chambers; and
    valve means for sealing the fluid constituent within each chamber from the fluid constituent within each of the other chambers
    whereby when said activating means is actuated a battery of active individual electrochemical cells arranged in series is provided with each housing section serving as the positive terminal for the electrochemical system within one chamber and the negative terminal for the electrochemical system within an adjacent chamber.

2. A reserve battery of electrochemical cells in accordance with claim 1 wherein
    each of said housing sections includes a first contact portion and a second contact portion extending in opposite directions;
    each of said chambers contains
        a set of anode electrode members, and
        a set of cathode electrode members,
        said anode electrode members and said cathode electrode members being arranged in alternation and separated by separators of insulating material,
        the anode electrode members being in electrical contact with one of the contact portions of one of the housing sections forming the chamber, and
        the cathode electrode members being in electrical contact with the other of the contact portions of the other of the housing sections forming the chamber.

3. A reserve battery of electrochemical cells in accordance with claim 2 wherein
    the anode electrode members of a set are in direct physical contact with said one of said contact portions and are spaced from said other of said contact portions; and
    the cathode electrode members of a set are in direct physical contact with said other of said contact portions and are spaced from said one of said contact portions.

4. A reserve battery of electrochemical cells in accordance with claim 3 wherein
    said first contact portion of said one of the housing sections forming the chamber is encircled by the chamber; and
    said second contact portion of said other of the housing sections forming the chamber encircles said first contact portion of said one of the housing sections and encircles the chamber.

5. A reserve battery of electrochemical cells in accordance with claim 4 wherein
    each anode electrode member includes an oxidizable active material;
    each cathode electrode member includes porous conductive material; and
    said fluid constituent of an electrochemical system includes an electrolytic solution comprising a reducible liquid cathode material and an electrolyte solute dissolved therein.

6. A reserve battery of electrochemical cells in accordance with claim 5 wherein
    the oxidizable active material includes lithium; and
    said reducible liquid cathode material includes a fluid oxyhalide.

7. A reserve battery of electrochemical cells comprising
    a plurality of similar housing sections of conductive material arranged in series;
    each housing section including
        a flat, planar disc of conductive material having a central opening,
        a first hollow cylindrical member of conductive material contiguous the edge of the disc at the central opening, extending in one direction normal to the plane of the disc, and having an edge surface at the end thereof spaced from the disc,
        said first cylindrical member having an opening therein providing a passageway therethrough,
        a second hollow cylindrical member of conductive material contiguous the outer edge of the disc, extending in the opposite direction normal to the plane of the disc, and having an edge surface at the end thereof spaced from the disc,
    a first member of insulating material contiguous said edge surface at the end of each of said first cylindrical members, a second member of insulating material contiguous said edge surface at the end of each of said second cylindrical members, said first member of insulating material contiguous the edge surface at the end of the first cylindrical member of each housing section except the first housing section in the series being contiguous the disc of the preceding housing section in the series adjacent to said central opening;

said second member of insulating material contiguous the edge surface at the end of the second cylindrical member of each housing section except the last housing section in the series being contiguous the disc of the succeeding housing section in the series adjacent to the outer edge;

each two adjacent housing sections in the series forming a chamber between them;

each chamber containing
- an anode electrode member of an electrochemical system,
- a cathode electrode member of an electrochemical system,
- the anode electrode member being in electrical contact with one of said first and second cylindrical members of one of the housing sections forming the chamber, and
- the cathode electrode member being in electrical contact with the other of said first and second cylindrical members of the other housing section forming the chamber;

the first cylindrical members of said housing sections forming a conduit with said openings in said first cylindrical members providing passageways from the conduit to the chambers;

reservoir means containing a fluid constituent of an electrochemical system, said fluid constituent, an anode electrode member, and a cathode electrode member providing a complete electrochemical system of an electrochemical cell;

a channel between said reservoir means and said conduit;

rupturable sealing means sealing said channel to prevent the passage of fluid constituent from said reservoir means to said conduit while said rupturable sealing means is intact;

activating means operable when actuated to rupture said rupturable sealing means and force said fluid constituent in the reservoir means through said channel into said conduit and through said passageways into said chambers; and valve means for sealing the fluid constituent within each chamber from the fluid constituent within each of the other chambers whereby when said activating means is actuated a battery of active individual electrochemical cells arranged in series is provided with each housing section serving as the positive terminal for the electrochemical system within one chamber and the negative terminal for the electrochemical system within an adjacent chamber.

8. A reserve battery of electrochemical cells in accordance with claim 7 wherein
each of said first members of insulating material extends across said conduit and includes a valve permitting said fluid constituent to be forced therethrough in the direction from the reservoir means, said valve sealing off said conduit to isolate the fluid constituent on each side thereof after the fluid constituent has been forced therethrough and into the chambers.

9. A reserve battery of electrochemical cells in accordance with claim 7 wherein each of said chambers contains
- a set of substantially flat, planar generally circular anode electrode members;
- a set of substantially flat, planar generally circular cathode electrode members;
- said anode electrode members and said cathode electrode members being arranged in alternation and separated by separators of insulating material;
- the electrode members of one set having a central opening of a diameter greater than the outer diameter of the first cylindrical member of a housing section and having an outer diameter greater than the inner diameter of the second cylindrical member of a housing section whereby the electrode members of the set make electrical contact to the second cylindrical member and are electrically isolated from the first cylindrical member of the housing sections forming the chamber; and
- the electrode members of the other set having a central opening of a diameter less than the outer diameter of the first cylindrical member of a housing section and having an outer diameter less than the inner diameter of the second cylindrical member of a housing section whereby the electrode members of the set make electrical contact to the first cylindrical member and are electrically isolated from the second cylindrical member of the housing sections forming the chamber.

10. A reserve battery of electrochemical cells in accordance with claim 9 wherein
each of said first members of insulating material extends across said conduit and includes a valve permitting said fluid constituent to be forced therethrough in the direction from the reservoir means, said valve sealing off said conduit to isolate the fluid constituent on each side thereof after the fluid constituent has been forced therethrough and into the chambers.

11. A reserve battery of electrochemical cells in accordance with claim 10 wherein
each anode electrode member includes an oxidizable active material;
each cathode electrode member includes porous conductive material; and
said fluid constituent of an electrochemical system includes an electrolytic solution comprising a reducible liquid cathode material and an electrolyte solute dissolved therein.

12. A reserve battery of electrochemical cells in accordance with claim 11 wherein
the oxidizable active material includes lithium; and
said reducible liquid cathode material includes a fluid oxyhalide.

* * * * *